United States Patent [19]
Lüchinger et al.

[11] Patent Number: 5,604,334
[45] Date of Patent: Feb. 18, 1997

[54] PRECISION BALANCE

[75] Inventors: Paul Lüchinger, Uster; Beat Lüdi, Wetzikon, both of Switzerland

[73] Assignee: Mettler-Toledo AG, Greifensee, Switzerland

[21] Appl. No.: 277,251

[22] Filed: Jul. 19, 1994

[30] Foreign Application Priority Data

Sep. 8, 1993 [CH] Switzerland .............. 2681/93

[51] Int. Cl.⁶ .................. G01G 23/02; G01G 21/10
[52] U.S. Cl. .................... 177/154; 177/187; 177/189
[58] Field of Search ...................... 177/154, 155, 177/156, 157, 158, 159, 184, 187, 189

[56] References Cited

U.S. PATENT DOCUMENTS 3,973,637  8/1976  Kunz ........................... 177/189
4,254,841  3/1981  Loskill ......................... 177/187
4,574,898  3/1986  Freeman ....................... 177/154

FOREIGN PATENT DOCUMENTS 3242156  10/1991  Germany.
576634   6/1976   Switzerland.

Primary Examiner—Michael L. Gellner
Assistant Examiner—Randy W. Gibson
Attorney, Agent, or Firm—Friedrich Kueffner

[57] ABSTRACT

A precision balance of the type having a short-stroke measuring system includes a load receptor connected to the measuring system by means of a hanger. The load receptor has the shape of a yoke and extends around the hanger. The yoke-shaped load receptor rests on the ends of two arms of a receiving element, wherein the arms are attached to the bottom of the hanger and elastically prestressed to press against the hanger. The yoke-shaped load receptor is held at the upper part of the hanger in a manner allowing guided sideways movement of the load receptor.

9 Claims, 2 Drawing Sheets

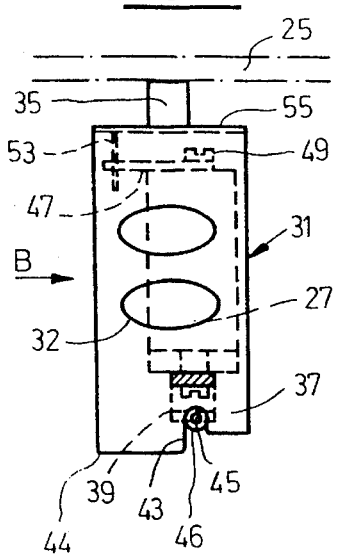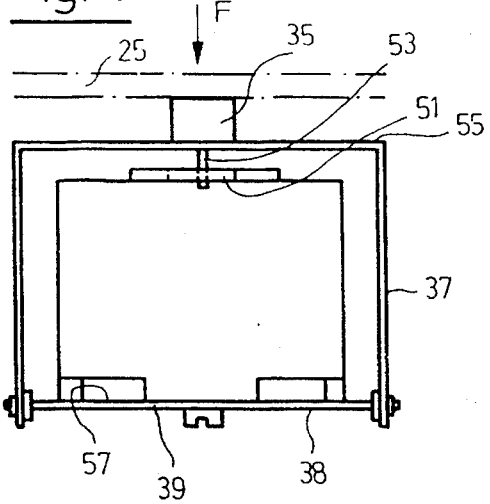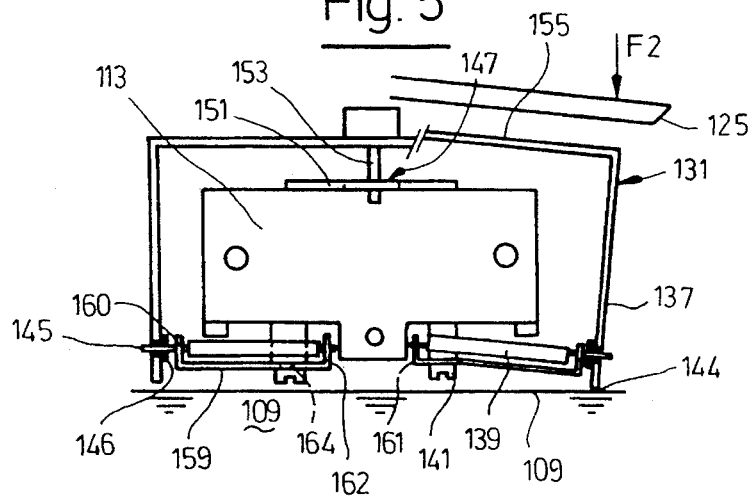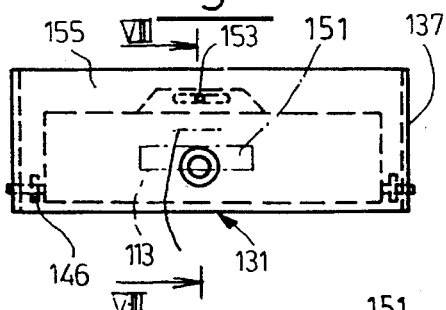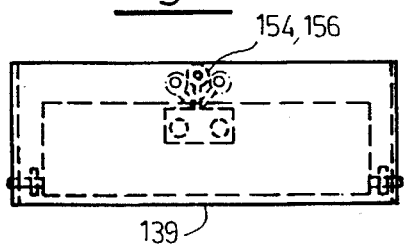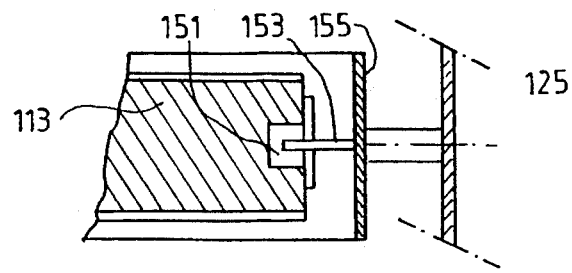

1

PRECISION BALANCE

BACKGROUND OF THE INVENTION

1. Field of the Invention

The present invention relates to a precision balance of the type having a short-stroke measuring system and a load receptor connected to the measuring system by means of a hanger.

2. Description of the Related Art

In high-resolution precision balances, even a slight shock to the weighing pan when loading a weighing object on the weighing pan can lead to damage in sensitive components of the balance. Such damage arises as a consequence not only of an overload or an eccentric load acting in the direction perpendicular to the pan, but also from forces that are introduced into the hanger transversely of or at an acute angle relative to the weighing pan.

From the prior art, precision balances are known in which the hanger is protected from damage by means of an overload or eccentric load protection device.

In Swiss Patent Nr. 576,634, the weighing pan of the balance is constructed in two parts. The pan which receives the weighing object rests on an under-pan of light sheet metal, wherein the under-pan has an annular rim which ends only a few millimeters from the enclosure of the balance. Concentric with the rim, in a hole with loose play, a hollow bolt is inserted, the bolt having a collar that bears loosely against the under-pan. A retaining ring is fitted on the leg of the hollow bolt. Held captive between the retaining ring and the under-pan, there is, in addition, a star-shaped leaf spring which, with the tips of its arms, presses the under-pan against the collar of the bolt. The star-shaped spring is prestressed to an extent that the spring force bearing against the under-pan is greater than the maximum weighing load of the precision balance. Consequently, when weighing within the weighing range of the balance, the under-pan remains held in contact with the collar, and the spring has no influence on the weighing force. If an eccentric load acts on the weighing pan, particularly if the load exceeds the weighing range of the balance, the weighing pan will be allowed to tip on the side of the load, and the under-pan will come to rest against the enclosure of the balance. Damage to mechanical elements, e.g., to the parallel-motion linkage, guide arms, etc. is thus prevented.

This known device meets its purpose as long as the excessive load acts on the weighing pan essentially vertically from above. A force acting horizontally or from an acute angle will not be absorbed by the spring-loaded support of the weighing pan, but will impact directly on the hanger.

A device protecting against eccentric load/overload operating in a similar manner is also disclosed in U.S. Pat. No. 4,475,898 and in DE-C2-3242156. In these known balances, too, forces meeting the weighing pan horizontally or at an angle are not kept from reaching the hanger.

SUMMARY OF THE INVENTION

Therefore, it is the primary object of the present invention to provide an overload protection and eccentric load protection in precision balances for protecting the hanger from vertical as well as transverse forces.

In accordance with the present invention, the above object is met by a precision balance in which the load receptor has the shape of a yoke and extends around the hanger. The yoke-shaped load receptor rests on the ends of two arms of a receiving means, wherein the arms are attached to the bottom of the hanger and elastically prestressed to press against the hanger. The yoke-shaped load receptor is held at the upper part of the hanger in a manner allowing guided sideways movement of the load receptor.

Forces meeting the weighing pan eccentrically or at an angle effect a tilting of the load receptor which, through its downwardly projecting legs, rests on the receiving means that elastically yield to forces in the overload range. Through the one-sided tilt of the load receptor, the end of one leg is brought to rest against the understructure of the balance, thereby preventing the hanger from being subjected to forces that could strain the balance out of adjustment. By placing the points where the load receptor contacts the hanger at a large distance from the axis of symmetry of the weighing pan, the load receptor can take up eccentric loads and introduce them to the receiving means on one side. The receiving means, which may comprise a prestressed leaf spring, have a very small mass of their own. Thus, the forces introduced into the balance are taken up with virtually no inertia. The pre-tension of the spring is large enough so that the forces introduced when weighing within the weighing range of the balance can be transmitted non-elastically to the weighing cell. When a force of essentially horizontal direction is introduced, the load receptor is lifted on one side from the receiving means while continuing to be guided by the receiving means. A roller attached to the end of the receiving means allows the disengaged leg to lift off and later to slide back with minimal friction. At the same time no torque is introduced into the upper portion of the hanger due to the unrestricted freedom of lateral movement of the load receptor.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 3 is a side view of the load receptor and a part of the hanger seen in the direction of arrow A in FIG. 2;

FIG. 4 is a side view of the hanger and the load receptor seen in the direction of arrow B in FIG. 3;

FIG. 5 is a detail view of the support of the load receptor in another embodiment of the balance according to the invention;

FIG. 6 is a top view of the load receptor of the balance of FIG. 5;

FIG. 7 is a top view of a load receptor having a lateral guide swivellable about an axis; and FIG. 8 is a sectional view taken along sectional line VIII—VIII of FIG. 6.

DETAILED DESCRIPTION OF THE PREFERRED EMBODIMENTS

Figure 1:
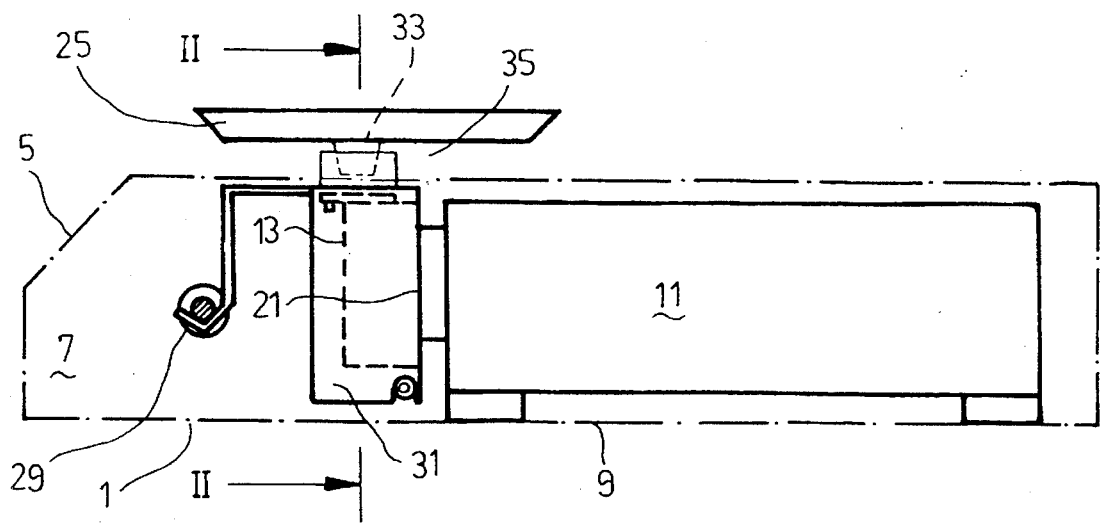
FIG. 1 is a schematic side view of a balance according to the present invention.

The balance housing, indicated by a dash-dot broken line in FIG. 1, encloses a space 7 which contains the operating elements and holds a keyboard area 5. Further in space 7 are housed the weighing mechanism and electronics. A measuring cell is represented schematically as rectangle 11. To the left of measuring cell 11 is placed a hanger 13 which is coupled to the sensor of a short-stroke measuring system, i.e. the measuring cell. The balance pan 25 sits on a load receptor 31 which sits astride the hanger 13. Further represented schematically in FIG. 1 below weighing pan 25 is a calibration weight 29 which may be set down on load receiver 31. The weighing pan 25 has on its underside a truncated cone 33 which sits removably in a mating socket 35 on load receptor 31.

Figure 2:
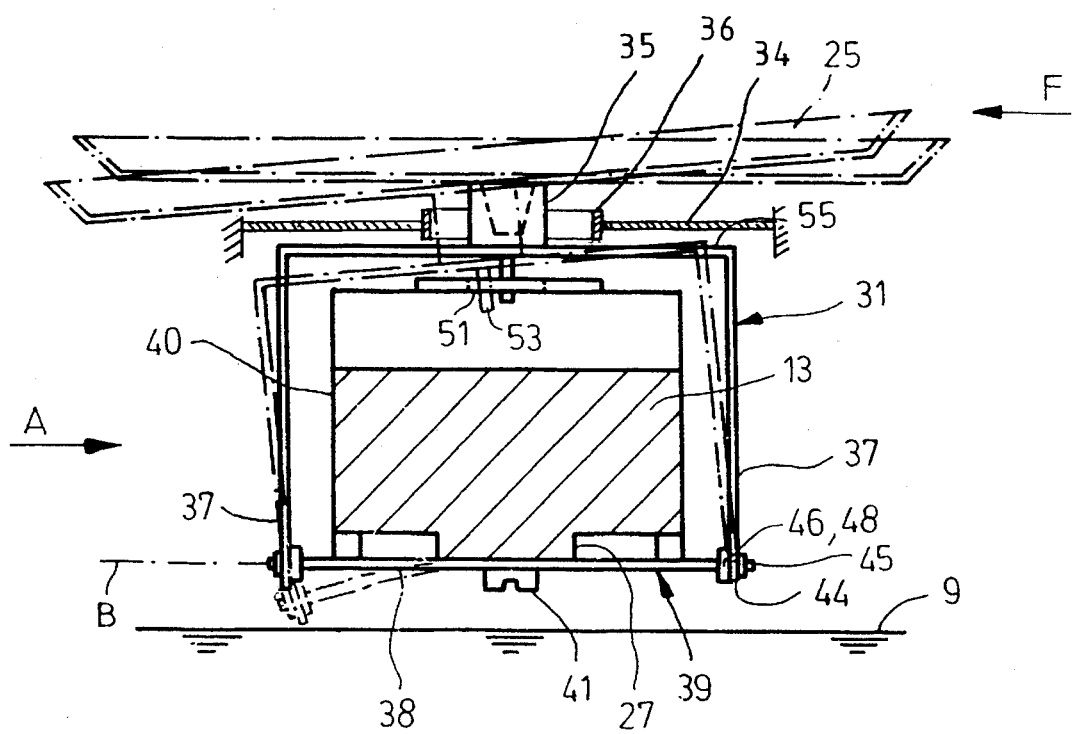
FIG. 2 is a partial cross-sectional view of the balance taken along sectional line II—II of FIG. 1.

The socket 35 traverses a sheet metal stop 34 whose central opening is bordered by a stop ring 36. In FIG. 2 the inner diameter of the stop ring 36 is exaggerated in proportion to the diameter of socket 35. Also shown in exaggeration is the sideways tilt of weighing pan 25.

In the sectional view of FIG. 2 the U-shaped load receptor 31 is seen from the front. Two legs 37 fastened to transverse section 55 extend downwards and surround hanger 13 in a manner resembling a yoke, i.e. the legs extend along the sides of hanger 13. Load receptor 31 is preferably stamped and formed as an aluminum sheet metal part, which may in addition have perforations 32 (see FIG. 3) or be constructed as a lattice, in order to reduce mass without sacrificing rigidity. Socket 35 which holds the weighing pan 25 is mounted on and connected to transverse section 55.

Load receptor 31 is connected to hanger 13 through elastically prestressed receiving means 39 of small inertial mass. The receiving means is fastened to the underside of hanger 13, e.g., with a screw 41, or by other appropriate means.

The receiving means 39 in the first embodiment according to FIGS. 2 to 4 includes a horizontally positioned leaf spring 38 which projects beyond the lateral surfaces 40 of hanger 13, and which at its midpoint is fastened by means of screw 41 or by other fastener means to hanger 13 at the underside of a protrusion 27. The legs 37 of load receptor 31 rest on the ends 45 of spring 38. Additionally, in a preferred embodiment, rotatably mounted rollers 46 constructed of plastic or metal are positioned at the ends 45 of receiving means 39, the receiving means in this case being a leaf spring. The rollers 46 are shaped to fit into vertical slot-shaped cutouts 43 at the bottom edges 44 of legs 37. The cutouts 43 are dimensioned so that rollers 46 are being held with a small amount of play. Consequently, legs 37 of load receptor 31, when the latter is placed on hanger 13, are resting through point-shaped contact on receiving means 39 or on rollers 46, and are held in guided engagement. Rollers 46 may be provided with flanges 48, to restrain the load receptor 31 with a small amount of play also in the axial direction of rollers 46.

On the top surface of hanger 13 a guide plate 47 is attached by a screw 49 or by other means. Guide plate 47 projects beyond hanger 13 on one side and in the projecting portion has a slot 51 oriented in parallel with receiving means 39. Likewise, a guide slot 151 may be provided on the topside itself of hanger 113 (FIG. 8). Slot 51, 151 is engaged from above by a guide pin 53, 153 which is mounted on transverse section 55, 155 of load receptor 31, 131 and projects downwardly. A die-cut and downwardly bent flap in transverse section 55, 155, or another restraining guide with two degrees of freedom (not shown), may take the place of guide pin 53, 153. The purpose of guide pin 53 is to restrain load receptor 31, the latter resting only on the two support points at the ends 45 of receiving means 39, and to prevent it from tipping or from turning about an axis B, shown in FIG. 2, defined by ends 45 of receiving means 39. On the other hand, guide pin 53 is to allow a limited swiveling to the side as well as a simultaneous vertical movement with low friction in a plane defined by receiving means 39 and slot 51. Receiving means 39 in the form of leaf spring 38 in the first embodiment, is designed so that, in its rest position shown in FIG. 4, it is prestressed to press against contacts 57 on the underside of hanger 13 (axis B is horizontal). The pre-tension of receiving means 39 is dimensioned to be greater than the maximum allowable load of balance 1. An advantageous amount of pre-tension, i.e., the pressure force that the ends 45 exert on the underside of hanger 13, may, e.g., equal one and a half times the maximum load of balance 1, at each of the two contacts 57.

If the weighing pan 25 is loaded by a force acting on the edge of weighing pan 25 vertically from above (eccentric load), load receptor 31 and weighing pan 25 will tilt to the side, so that the arm of receiving means 39 which lies below the point of force application will yield downwards when the applied force exceeds an amount of, e.g., one and a half times the maximum allowable load of the balance. Consequently, the lower end of leg 37 will come into contact with the balance base 9 (see left-hand side of FIG. 2; also FIG. 5, right side). The opposite leg 37 in the tilted condition is lifted off from roller 46, yet without roller 46 leaving slot 43. Under this kind of a load, weighing pan 25 swivels about the point where receiving means 39 is attached to the underside of hanger 13. The swivel axis B is defined by screw 41. Together with weighing pan 25, transverse section 55 of load receptor 31 tilts to the side, guided by guide pin 53 in slot 51, until socket 35 comes in contact with stop ring 36. Consequently, only a very small torque is introduced into hanger 13.

When a horizontal or nearly horizontal force is introduced to the weighing pan 25 (force F in FIG. 2), the load receptor 31 on the side of the force introduction is lifted off the receiving means 39, respectively off the roller 46 which is located there, and rotates about the support point (roller 46) at the opposite end 45 of load receiving means 39. Transverse section 55 of load receptor 39, being raised and moved sideways, stays guided in low-friction contact at slot 51 during this entire swiveling motion until socket 35 meets the limit stop. Through pin 53 guided in slot 51, load receptor 31 is retained in its vertical position, even when the sideways-directed force reaches a magnitude which causes the end 45 forming the center of rotation of the load receptor 31 to be deflected downwardly, i.e., when a force bears down on the contact point which exceeds the spring force of spring 38.

If the load is centered or nearly centered from above, but exceeding the allowable measuring range of the balance, receiving means 39 will yield on both sides, and both legs 37 come into contact with the understructure or base plate of the balance, preventing the introduction of excessive forces into hanger 13.

In the second embodiment of the invention according to FIGS. 5 to 7, the legs 137 of load receptor 131 are no longer resting directly on the ends of a spring or on rollers 146 placed at the ends 145 of the spring; but rather the receiving means 139 are held by two springs 159 that are mounted independently of each other at the underside of hanger 113 by screws 141 or other means. The screws 141 run through cutouts 164 in the bases of springs 159, the cutouts being located closer to those of the angled ends 162 that are near the center of the underside of hanger 113. The. U-shaped springs are, therefore, mounted asymmetrically.

The two receiving means 139 comprise axles or rods. The ends 145 of the rods have stepped-down sections that are held in holes 160 in the angled-up portions 161 on both sides of springs 159. At the ends 145, rotatable rollers 146 may again be attached.

The lower ends 144 of legs 137 of load receptor 131 are, in analogy to the configuration in FIGS. 2 to 4, provided with slot-shaped apertures 143 and held supportively, with a small amount of play, by the stepped-down sections at the ends of the rods of the receiving means 139. Attached at the topside of hanger 113 is a guideplate 147 provided with a guide slot 151 which engages guide pin 153 fastened to transverse section 155. Alternatively, on hanger 113 there may be a pivotably mounted swivel arm 154 holding guide pin 153 at its free end 156. Swivel arm 154 may be attached to a bolt in the hanger 113 (not shown) or it may be configured as a spring element fastened to the hanger, permitting sideways swivel motion of the free end in a range of several millimeters (shown in exaggerated manner in FIG. 7).

With a force introduced by an eccentric load F2 acting on the right side and exceeding the weighing range of balance 1, receiving means 139, as shown in the right-hand portion of FIG. 5, tilts clockwise about its point of attachment at screw 141. Consequently, the lower end of the downwardly depressed leg 137 comes in contact with the base or understructure 109 of the balance, preventing that a force greater than the force of spring 159 in receiving means 39 is introduced into hanger 113. A force acting horizontally on weighing pan 125—as explained previously for the first embodiment and shown in FIG. 2—causes the load receptor 139 to be lifted on one side and, in the case of the pin guide according to FIG. 7, a swiveling movement of swivel arm 154, until socket 35 is stopped by stop ring 36. The end of swivel arm 154 traveling in an arc causes a slight tipping and deflection of load receptor 139 relative to the two support bearings at the ends 145 of receiving means 139. However, the tilt of load receptor 139 is so slight as to be negligible.

The overload protection in accordance with the invention protects balance 1 not only in the case of vertically acting loads, but also such loads as are introduced laterally from the right, from the left, or at an angle from above. Loads from other directions, e.g. from the front, i.e., at a right angle to slot 51, 151, do generally not occur in balances with an enclosed weighing compartment with only lateral access openings for loading the weighing pan. In balances lacking an enclosed weighing compartment, there is likewise little danger of a force introduction from the front, the balance being usually loaded from the side.

The invention is not limited by the embodiments described above which are presented as examples only but can be modified in various ways within the scope of protection defined by the appended patent claims.

We claim:

1. A precision balance comprising a short-stroke measuring system and a load receptor, a hanger for connecting the load receptor to the measuring system, the load receptor being yoke-shaped and partially surrounding the hanger, the hanger having a bottom, further comprising pre-tensioned receiving means attached to the bottom of the hanger, the receiving means having ends projecting from the hanger, the load receptor being placed on the ends of the receiving means, the load receptor having a top, the hanger having a guide means for laterally slidably guiding the top of the load receptor.

2. The precision balance according to claim 1, wherein the load receptor comprises a transverse portion at the top thereof, the transverse portion having a center, a weighing pan being supported on the center of the transverse portion, and two legs projecting downwardly from the transverse portion, the legs having ends, the ends of the legs resting on the receiving means.

3. The precision balance according to claim 2, wherein the guide means comprises a guide pin connected to the transverse portion and projecting downwardly between the legs, and a guide slot defined by the hanger, wherein the guide pin is in engagement with the guide slot.

4. The precision balance according to claim 3, wherein the guide slot extends parallel to the receiving means.

5. The precision balance according to claim 1, wherein the hanger has sides, the ends of the receiving means projecting laterally from the sides of the hanger.

6. The precision balance according to claim 5, wherein the receiving means comprises a pre-tensioned leaf spring, the leaf spring having a middle, and a fastening means for connecting the middle of the leaf spring to the bottom of the hanger.

7. The precision balance according to claim 1, wherein the receiving means comprises two shafts, the shafts having ends, and U-shaped springs having upwardly bent ends and bores defined in the upwardly bent ends, the ends of each shaft being received in the bores of one of the springs, each spring being eccentrically connected to the bottom of the hanger.

8. The precision balance according to claim 2, further comprising rollers mounted on the ends of the receiving means, the legs of the load receptor resting with play on the rollers.

9. The precision balance according to claim 1, wherein the hanger has a top, and wherein the guide means comprises a swivel arm connected to the top of the hanger, a pin in a top portion of the load receptor engaging the free end of the swivel arm.

* * * * *